United States Patent
Mahankali et al.

(10) Patent No.: US 11,476,783 B1
(45) Date of Patent: Oct. 18, 2022

(54) OPERATIONAL TRANSITION CONTROL OF A MOTOR

(71) Applicant: TEXAS INSTRUMENTS INCORPORATED, Dallas, TX (US)

(72) Inventors: Venkata Pavan Mahankali, Bangalore (IN); Prasad Kulkarni, Bengaluru (IN); Ganapathi Hegde, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/359,158

(22) Filed: Jun. 25, 2021

(51) Int. Cl.
*H02P 6/21* (2016.01)

(52) U.S. Cl.
CPC ..................... *H02P 6/21* (2016.02)

(58) Field of Classification Search
CPC .......................................................... H02P 6/21
See application file for complete search history.

(56) References Cited

U.S. PATENT DOCUMENTS

| | | | | |
|---|---|---|---|---|
| 6,157,264 A | * | 12/2000 | Adkins | H03L 7/089 331/25 |
| 10,523,144 B1 | * | 12/2019 | Mogensen | H02P 6/182 |
| 10,658,956 B2 | | 5/2020 | Lu et al. | |
| 2017/0346420 A1 | * | 11/2017 | Ross | H02P 6/182 |
| 2019/0020292 A1 | * | 1/2019 | Lu | H02P 6/181 |
| 2019/0386592 A1 | * | 12/2019 | Mogensen | H02P 6/182 |

* cited by examiner

*Primary Examiner* — Muhammad S Islam
*Assistant Examiner* — Devon A Joseph
(74) *Attorney, Agent, or Firm* — Michael T. Gabrik; Charles A. Brill; Frank D. Cimino (57) ABSTRACT

Example systems and processes control transition of an electric motor from open-loop operation to closed-loop operation by detecting zero-crossing (ZC) locations of the back-electromotive force (BEMF). The rotor angle of the electric motor is changed, e.g., by changing acceleration of the electric motor to correct a phase difference based on the detected ZC locations and an open-loop profile of the electric motor. Detected ZC locations may be used to identify ZC-detected-based commutation points, and each detected ZC location may be used to update a next commutation point. During the control process the open-loop profile is updated. Transition may occur when a set number of ZC-detection-based commutation points are sufficiently aligned with corresponding updated commutation points, or such alignment is maintained for at least one electrical cycle.

21 Claims, 6 Drawing Sheets

OPERATIONAL TRANSITION CONTROL OF A MOTOR

FIELD OF DISCLOSURE

This disclosure relates generally to controlling transition of a brushless, direct current (DC) electric motor from a first operational mode to a second operational mode, and more particularly to transitioning from the first to the second operational mode based on detected zero-crossing (ZC) locations of back-electromotive force (BEMF) during the first operational mode.

BACKGROUND

Various types of electrical motors transition from one operational mode to another. For example, a brushless, direct current (BLDC) electric motor initially begins operation in a startup mode (e.g., an open-loop mode) in which forced commutation is used and a stator generates a rotating magnetic field that begins to rotate the motor's rotor at low speeds. Once the rotor attains a sufficient speed, operation switches from the startup (open-loop) mode to a run mode, e.g., a closed-loop mode.

During startup of a BLDC electric motor, sufficient back-electromotive force (BEMF) is built up, and rotor position is tracked as it spins using BEMF. For accurate and reliable operation, the motor should be allowed to build up sufficient BEMF as quickly as possible, and the phase of the applied voltage should be synchronized with BEMF based on the load profile before switching to run or closed-loop operation.

In conventional systems, during open-loop operation, the motor is forcibly commutated using a second order velocity profile, and based on the operating constraints of the motor and its load profile, multiple parameters are programmed to set the speed and acceleration rate at which transition to closed-loop operation is to occur. Precise tuning of these parameters is needed to match the load profile of the motor and thereby decrease the phase difference between the applied voltage and BEMF. Not only is attaining such precision challenging, it is cumbersome and complex to identify the transition points for different motors. Moreover, improper tuning parameters and the inherent phase difference between the applied voltage and BEMF may lead to commutation failures during closed-loop operation, which may result in the motor stalling. Reliably switching from open loop operation to closed loop operation is very important in many applications, such as those in which very rapid startup is required, i.e., to accelerate the motor from zero to full speed in less than 100 milliseconds. A solution to these issues is desirable.

SUMMARY

In accordance with an example, a process of operating an electric motor is provided. The process comprises accelerating a rotor of the electric motor in a first mode of operation based on an operating condition of the motor; detecting a parameter of the electric motor operating in the first mode of operation; adjusting an angular position of the rotor in the first mode of operation based on the detected parameter and an operating profile of the electric motor; and determining when to transition operation of the motor from the first mode of operation to a second mode of operation based on the detecting and adjusting operations.

In accordance with another example of operating an electric motor, the process comprises detecting back-electromotive force (BEMF) zero-crossing (ZC) locations of the motor in an open-loop mode of operation based on a phase voltage or phase current of the electric motor; detecting ZC-based commutation points of the electric motor based on the detected BEMF ZC locations, respectively; adjusting an angular position of the rotor in the first mode of operation based on each detected BEMF ZC location and an open-loop profile of the electric motor; adjusting commutation points based on the detected ZC locations, respectively; and switching operation of the electric motor from the open-loop mode of operation to a closed-loop mode of operation when a set number of detected commutation points are within a set difference of respective updated commutation points.

In accordance with an example, a system comprises measurement logic configured to measure a back-electromotive force (BEMF) of an electric motor having a rotor; detection logic coupled to the measurement logic to detect a parameter of the electric motor based on the measured BEMF; and control logic coupled to the detection logic to determine a timing for transitioning the electric motor from an open-loop mode of operation to a closed-loop mode of operation based on the detected parameter and an open-loop profile of the electric motor.

These and other features will be better understood from the following detailed description with reference to the accompanying drawings.

BRIEF DESCRIPTION OF THE DRAWINGS

Features of the disclosure may be understood from the following figures taken in conjunction with the detailed description.

The same reference numbers and other reference designators are used in the drawings to designate the same or similar (structurally and/or functionally) features.

DETAILED DESCRIPTION

Specific examples are described below in detail with reference to the accompanying figures. These examples are not intended to be limiting. The objects depicted in the drawings are not necessarily drawn to scale.

In example arrangements, during start-up, i.e., during a low-speed, open-loop mode of operation, a system measures the back-electromotive force (BEMF), e.g., BEMF voltage, of one or more phases of an electric motor, e.g., a three-phase, brushless, direct current (BLDC) electric motor, detects zero-crossing (ZC) locations of the BEMF voltage, dynamically adjusts acceleration of the motor to align one or more parameters, e.g., detected ZC locations, with those of the motor's open-loop profile, and when sufficiently aligned, switches operation of the motor to higher speed, sensorless, closed-loop operation. For example, phase angle error between the applied voltage and the BEMF voltage is reduced to a set difference, e.g., ±15 electrical degrees, achieve such alignment.

Figure 1:
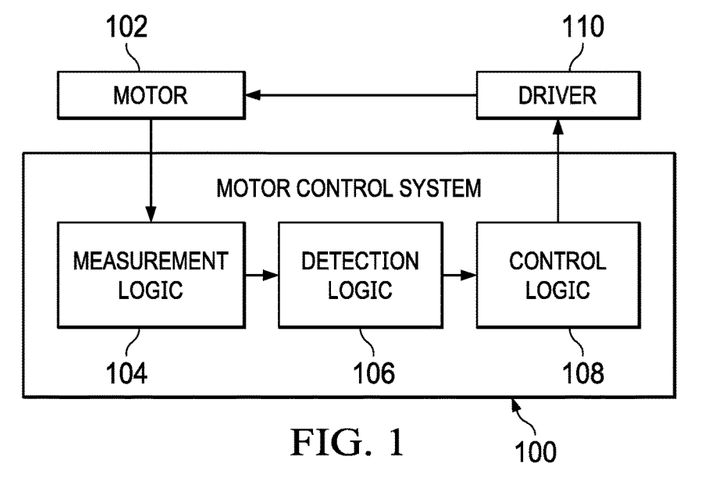
FIG. 1 is a block diagram illustrating an example system to control switching of an electric motor from a first mode of operation to a second mode of operation.

FIG. 1 illustrates an example of a motor control system 100 configured to control a motor 102, which may be an electric, three-phase, BLDC motor. System 100 includes logic (e.g., implemented in a motor controller) that is configured to receive feedback from motor 102, control open-loop operation of motor 102, and based on such control, determine when to transition operation of motor 102 from open-loop to closed-loop operation.

Example system 100 includes measurement logic 104, detection logic 106, and control logic 108. Control logic 108 is coupled to a driver 110 that is configured to supply electric current to phase windings of motor 102 in response to control signals provided by control logic 108. In some examples, some or all of the logic may be fabricated as part of a motor controller implemented on a common substrate, e.g., integrated in a common chip or die. For example, system 100 and its logic blocks may be implemented as hardware on a silicon chip, in an integrated circuit, in a field-programmable gate-array (FPGA), and/or with discreet logic devices. More generally, the functionality of system 100 may be implemented in a variety of ways consistent with the teachings herein.

In an example, measurement logic 104 is configured to receive and/or sample phase voltages and currents of motor 102. Measurement logic 104 includes voltage measurement circuitry to identify and measure for each phase voltage, its floating phases, e.g., non-conducting components which represent the BEMF voltage generated for that phase voltage. These measurements and the phase currents are provided to detection logic 106 for subsequent processing.

Detection logic 106 receives the BEMF voltage measurements from measurement logic 104 during open-loop operation of motor 102. Detection logic 106 is configured to detect zero-crossing (ZC) locations of the BEMF voltage and to detect commutation points based on the detected ZC locations and the phase currents, as is known in the art.

Initially, during open-loop operation, control logic 108 adjusts first order acceleration rates to sufficiently accelerate motor 102 to meet the torque demand of motor 102 based on its applied current limit, while control logic 108 is receiving motor operation information from detection logic 106. Control logic 108 receives as inputs the detected ZC locations of the BEMF voltage and the detected commutation points. Control logic 108 also stores, or has access to, an open-loop profile for motor 102. The open-loop profile includes speed and acceleration profiles, as well as ZC locations and commutation points that may be compared with detected ZC locations and commutation points, respectively. Control logic 108 may include circuitry, e.g., comparators, to compare detected ZC locations with those of the open-loop profile and to compare ZC-detection-based commutation points with those of the open-loop profile. Based on these comparisons, control logic 108 computes a phase angle error between the applied voltage and the BEMF voltage and adjusts the acceleration profile of motor 102 to reduce the phase angle error.

When motor 102 is initially supplied with higher current than the acceleration profile requires, motor 102 runs in an over fluxing state in which the detected BEMF ZC locations lead those of the open-loop profile, resulting in a positive phase angle error. In this case, control logic 108 sends control signals to driver 110 to further accelerate motor 102 to correct the phase angle error. When the opposite occurs, that is, motor 102 is initially supplied with lesser current than the acceleration profile requires, motor 102 runs in an under fluxing state in which the detected BEMF ZC locations lag those of the open-loop profile, resulting in a negative phase angle error. In this case, control logic 108 sends control signals to driver 110 to decelerate motor 102 to correct the phase angle error. In either case, the corresponding acceleration adjustment causes the detected BEMF ZC locations to more closely align with those of the open-loop profile. When the phase angle error is within a certain tolerance, e.g., within 15 electrical degrees (sometimes simply referred to as degrees), motor 102 is switched to closed-loop operation. Driver 110 supplies current to excite windings of motor 102 in response to the control signals supplied by control logic 108.

Figure 2:
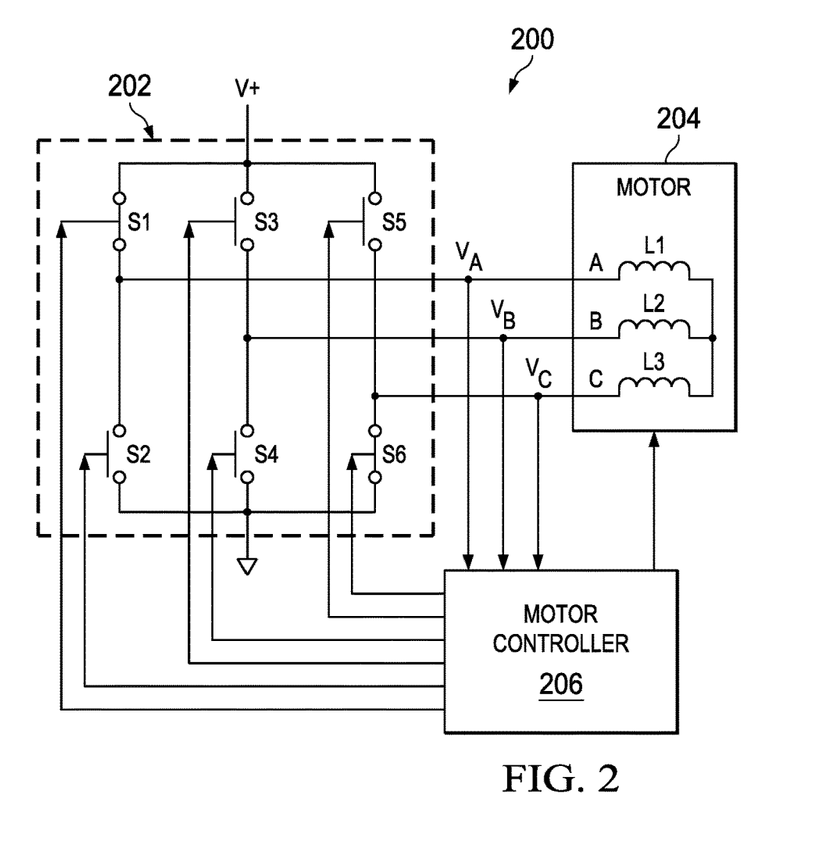
FIG. 2 is a block diagram of an example electric motor system.

FIG. 2 illustrates an example of a motor system 200 that includes a driver 202 coupled to a motor 204, which is represented as an electric three-phase motor having phase windings A, B and C. In the example of FIG. 2, phase windings A, B and C have inductances shown as L1, L2 and L3, respectively. As an example, motor 204 may have the configuration shown in FIG. 3. That is, motor 204 may include non-permanent electromagnetically activated magnets (electromagnets) 302 mounted in the motor's stator 304 and may have permanent magnets 306 mounted to rotor 308 which is positioned centrally to stator 304. However, the control and adjustment techniques described herein may be applied to other electric motor arrangements, i.e., having different numbers of permanent magnets and electromagnets. In the illustrated example of FIG. 3, electromagnets 302 of stator 304 may be activated with six commutation states that work in pairs to generate the phase voltages to rotate rotor 308.

Returning to FIG. 2, driver 202 may include an arrangement (e.g., H-bridge) of switch devices S1, S2, S3, S4, S5 and S6 (e.g., transistors). A motor controller 206 (e.g., corresponding to motor control system 100 of FIG. 1) is coupled to control the switches of driver 202 to generate output phase voltages $V_A$, $V_B$, and $V_C$ which are generally out-of-phase from each other. In the illustrated example, there are three upper switches S1, S3, and S5 connected to a high voltage supply V+ and three lower switches S2, S4, and S6 connected to a low (e.g., ground) voltage. The upper switches S1, S3, and S5 and the lower switches S2, S4, and S6 work in conjunction to supply phase current to the phase windings, which generate corresponding phase voltages $V_A$, $V_B$, and $V_C$.

Figure 3:
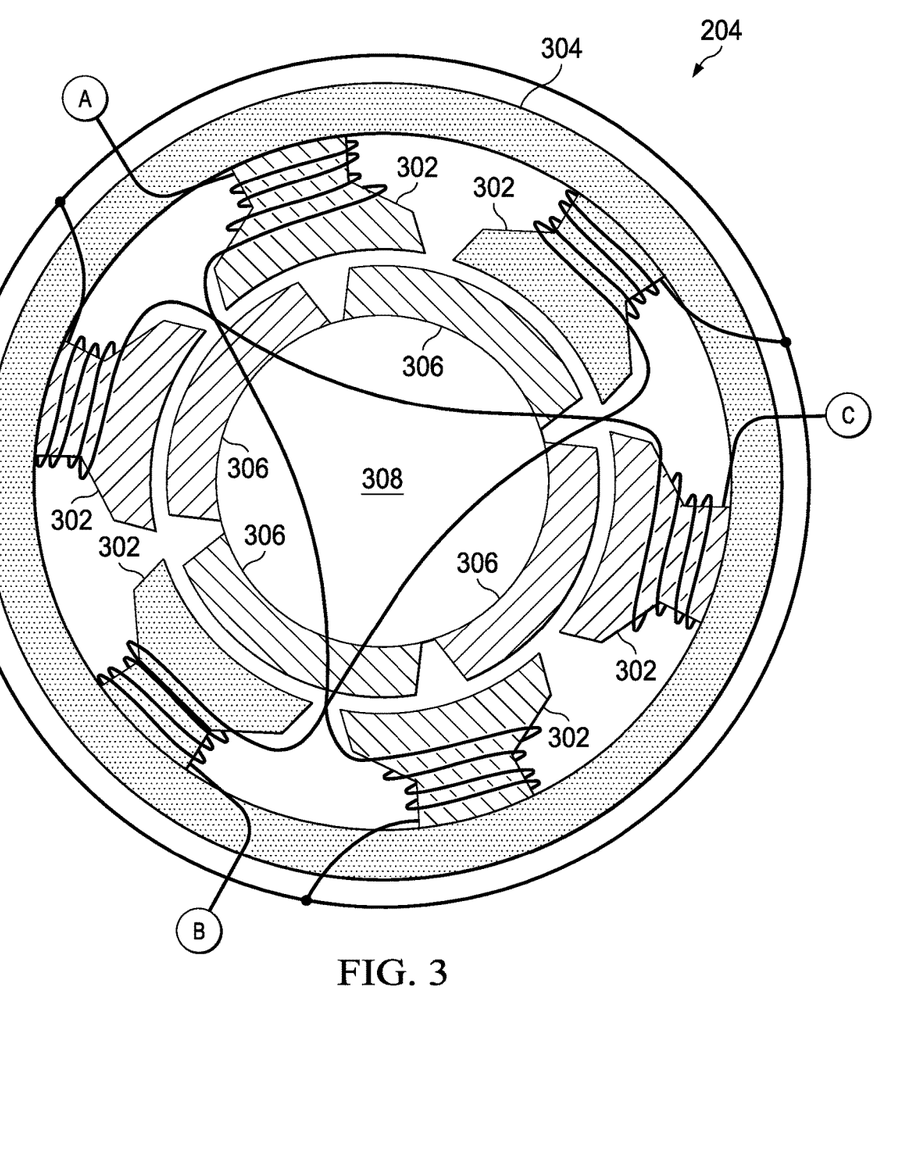
FIG. 3 is a schematic diagram of an example BLDC electric motor.

As disclosed herein, motor controller 206 is configured to control switching of motor 204 from open-loop operation (forced commutation control) to closed-loop operation (run mode) based on a comparison of detected ZC locations of BEMF signals with those of an open-loop profile of motor 204. ZC-detection-based commutation points may also be used as part of the determination to change modes of operation. To that end, motor controller 206 may include the functionality of measurement logic 104, detection logic 106 and control logic 108. That is, motor controller 206 may include suitable circuitry, e.g., voltage dividers, multiplexers and comparators, for measuring BEMF voltage, detecting ZC locations thereof, and comparing the detected ZC locations to those of the motor's open-loop profile, as well as circuitry for monitoring phase currents of motor 204 and determining commutation points based on the detected ZC locations. Motor controller 206 may further include circuitry to sense phase voltages, from which the BEMF voltage is measured. Based on these operations, motor controller 206 may supply control signals to switches S1-S6 in a prescribed order to generate the three phase voltages ($V_A$, $V_B$ and $V_C$) to power electromagnets 302 in stator 304 to effect desired movement of rotor 308.

Figure 4:
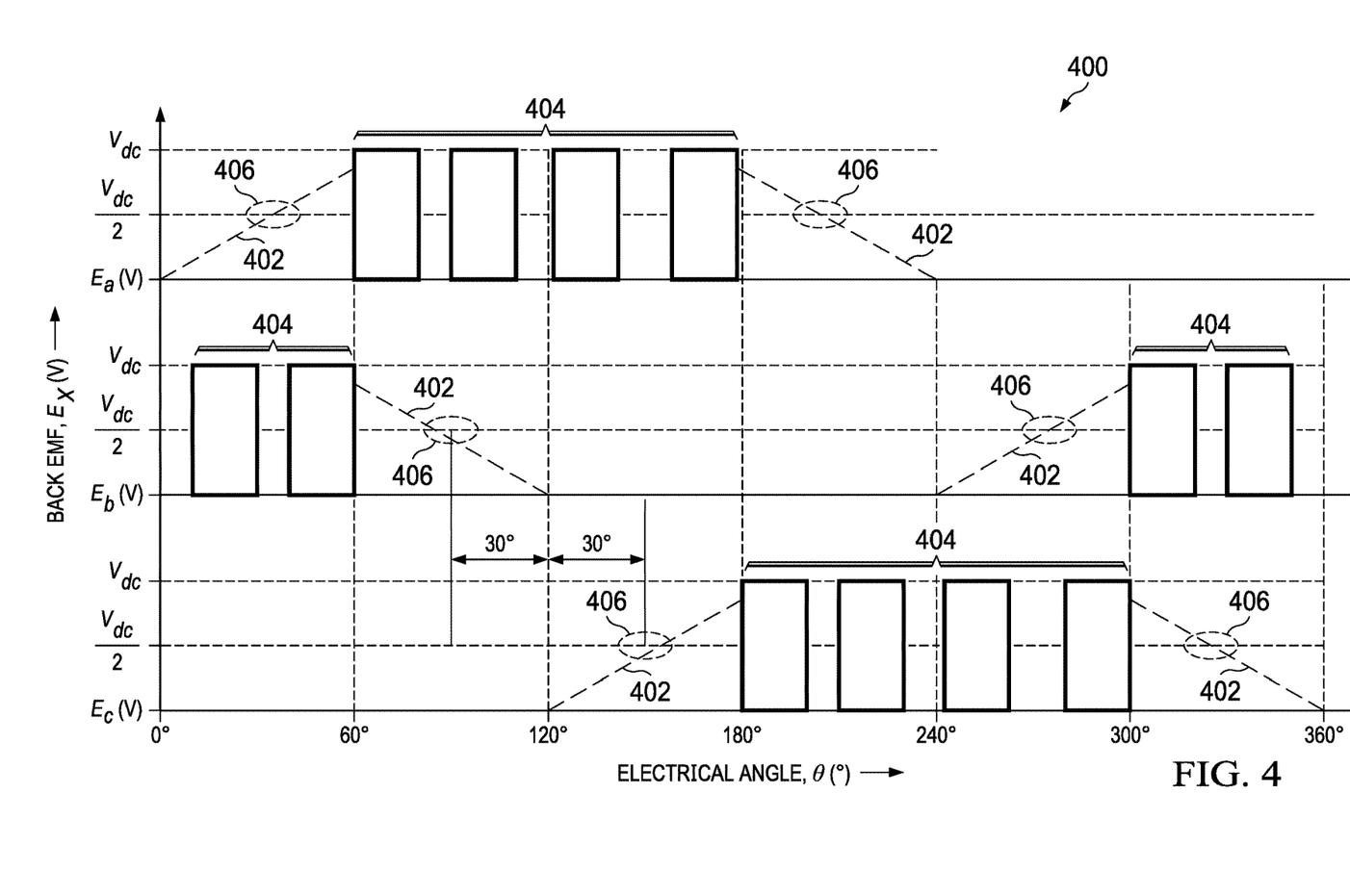
FIG. 4 is a graph of exemplary phase voltage waveforms over a plurality of commutation states.

FIG. 4 is a graph 400 illustrating exemplary phase voltage waveforms of a three-phase BLDC electric motor, such as motor 204. The voltages for phases A, B and C are denoted $E_a(V)$, $E_b(V)$ and $E_c(V)$, respectively, in FIG. 4. The phase voltages are shown at different rotor positions (electrical angle, $\Theta$, in electrical degrees) and commutation points occur at an interval of 60 electrical degrees. Each phase voltage has floating phases 402 and a conducting phase 404 for each electrical cycle, one of which is shown in FIG. 4. The floating phases 402, which ramp up or down, of each phase voltage correspond to the BEMF voltage for that phase. The BEMF voltages cross a set voltage (e.g., midpoint voltage) which represent BEMF ZC locations or points 406, which are circled on graph 400. Each commutation point occurs approximately 30 electrical degrees from the previous BEMF ZC location.

When measurement logic 104 (or motor controller 206) measures the BEMF voltage of each phase voltage, the corresponding phase winding is floating (e.g., non-energized). From the measured BEMF voltages, BEMF ZC locations are detected by detection logic 106 (or motor controller 206).

Conventionally, during open-loop operation, the rotor angle is incremented at a rate defined by the second order velocity profile of the particular motor, where the rate of change of the electrical angle of the rotor is equal to the velocity, which may be defined by a polynomial equation in a typical use case. Also, the forced commutation points are 60 degrees apart. Such approach, however, may result in transitioning from open-loop operation to closed-loop operation at the wrong time, which may lead to problems in closed-loop operation. Examples described herein provide a more reliable, flexible and robust approach to transitioning from open-loop to closed-loop operation.

Figure 5:
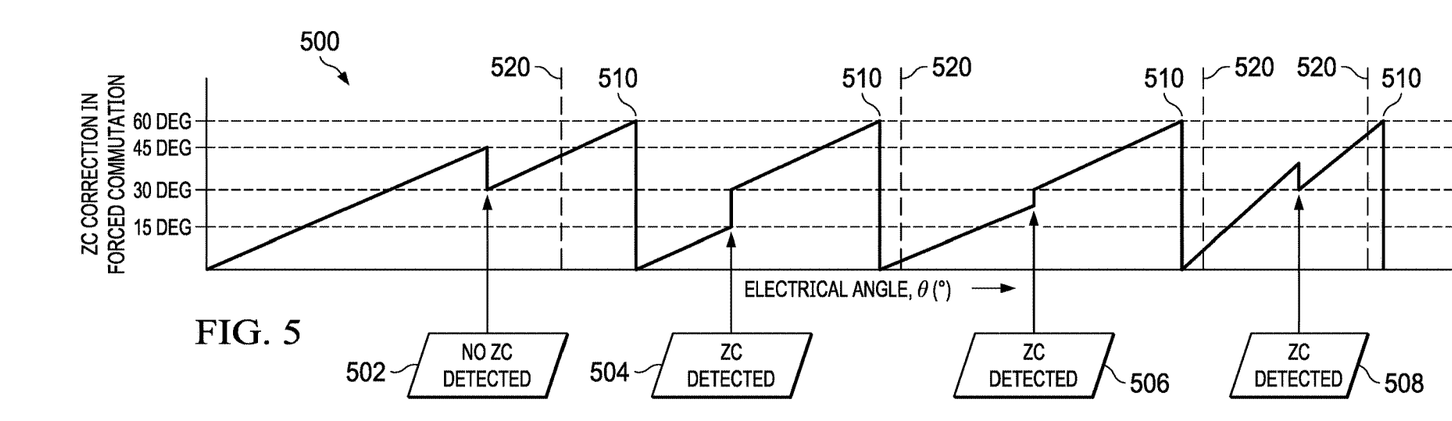
FIG. 5 is a diagram illustrating an example of variation of the electrical angle of a rotor of an electric motor over time during open-loop operation of the electric motor.

FIG. 5 is a diagram 500 that illustrates variation of the electrical angle of a rotor, e.g., rotor 308, over time during open-loop operation of an electric motor, e.g., motor 204, and shows adjusted or updated commutation points, which are based on detected ZC locations. While driving motor 204 in open-loop operation, the detected ZC locations of the BEMF voltages are used to correct the rotor angle to a set angular position, e.g., to 30 electrical degrees, and adjust or update the commutation points. In connection with each instance of ZC detection, motor controller 206 (or control logic 108) dynamically accelerates or decelerates motor 204 based on the detected ZC location and open-loop profile information, which includes the rate at which the rotor angle is incremented prior to the detected ZC location. After detecting each ZC location, the acceleration rate parameter and/or the rotor angle parameter of the open-loop profile information may be updated.

When open-loop commutation is significantly advanced, motor controller 206 delays commutation. For example, if ZC is not detected even as the electrical angle of rotor 308 reaches 45 degrees (502), the rotor angle is reset to 30 degrees by decelerating motor 204. When ZC is detected between 15 and 30 degrees inclusive (504 and 506), the rotor angle is reset to 30 degrees by accelerating motor 204 accordingly. If ZC is detected after 30 degrees but before 45 degrees (508), motor 204 is decelerated to reset the rotor angle to 30 degrees. After each ZC detection and corresponding change in acceleration of motor 204, the next commutation is adjusted or updated. The adjusted or updated commutation points 510 based on the corrected rotor angle are also shown in FIG. 5 in relation to commutation points 520 set by the original open-loop profile. Also, in each instance in which ZC is detected at or after 15 degrees, a ZC correction count is incremented. When the angular position of rotor 308 is repeatedly adjusted, the velocity of motor 204 starts to synchronize to the motor's load profile (e.g., torque demand) based on the current profile (e.g., applied current limit), and the open-loop profile's 30-degree rotor angle position moves closer (e.g., within 15 degrees) to the detected ZC locations.

Figure 6:
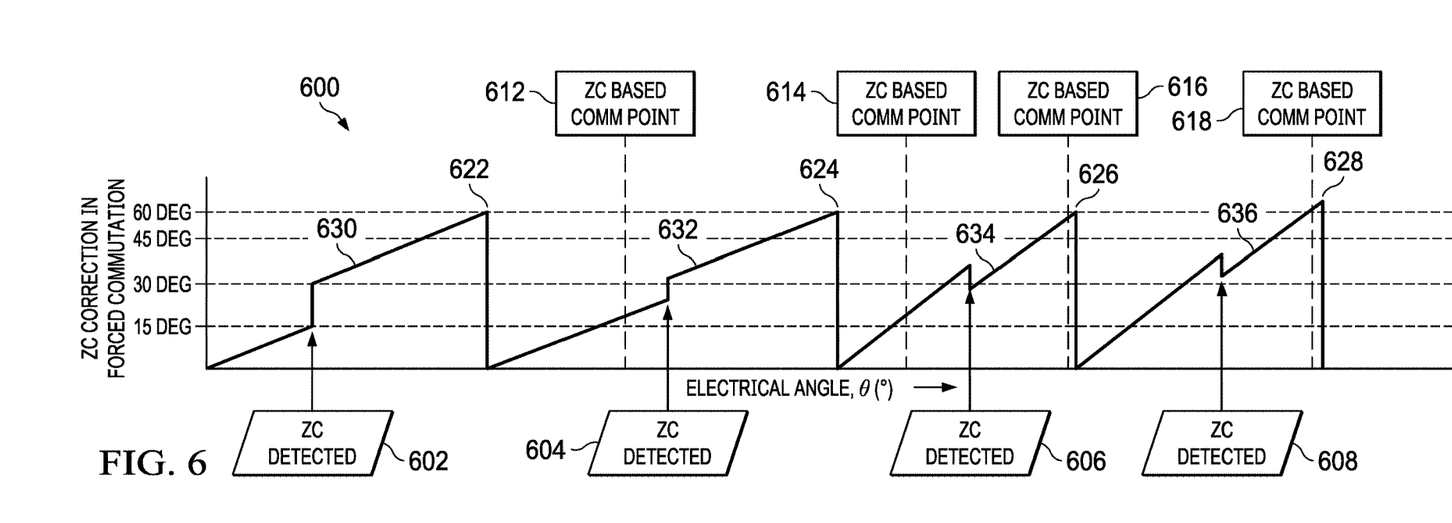
FIG. 6 is a diagram showing an example of variation of the electrical angle of a rotor of an electric motor over time during open-loop operation of the electric motor and illustrating an example of when to switch operation of the electric motor to closed-loop.

FIG. 6 is a diagram 600 that depicts variation of the electrical angle of a rotor, e.g., rotor 308, over time during open-loop operation of an electric motor, e.g., motor 204, illustrating an example of when to switch from open-loop operation to closed-loop operation. In the example of FIG. 6, detected ZC locations (602, 604, 606 and 608) fall within a range of 15 to 45 degrees. Thus, in each detection instance, acceleration of motor 204 is changed and/or the position of rotor 308 is reset to 30 degrees. Detected ZC locations 602 and 604 occur before 30 degrees, and thus motor 204 is accelerated in connection with each such detection. Because detected ZC locations 606 and 608 occur after 30 degrees, motor 204 is decelerated in connection with each such detection. As the detected ZC locations move closer to the reset angular position of rotor 308, e.g., 30 degrees, ZC-detection-based commutation points 612, 614, 616 and 618 become better aligned with respective adjusted/updated commutation points 622, 624, 626 and 628. As can be seen in FIG. 6, as acceleration/rotor angle adjustments are made, corresponding ZC-based and updated commutation points become more closely aligned. For example, later ZC-detection-based commutation point 618 is more closely aligned with corresponding updated commutation point 628 than earlier ZC-detection-based commutation point 612 is with respect to corresponding updated commutation point 622, indicating that motor 204 is approaching the handoff point, i.e., the time at which operation can be switched from open-loop to closed-loop. Such handoff point may be defined by a set angular difference, i.e., within ±15 degrees, between a ZC-detection-based commutation point and a corresponding updated commutation point. For reliability, handoff should wait until a sufficient number, e.g., a minimum of 2, of ZC-detection-based commutation points within the set angular difference (e.g., ±15 degrees) are identified before switching motor 204 to closed-loop operation. For example, the handoff or transition may be set to occur when all ZC-detection-based commutation points in one electrical cycle are within the set angular difference. The ZC correction count may be used in conjunction with the above determinations for increased reliability, so as not to switch to closed-loop too soon. For example, the system may be designed such that the ZC correction count is at least six before handoff is performed.

Figure 7:
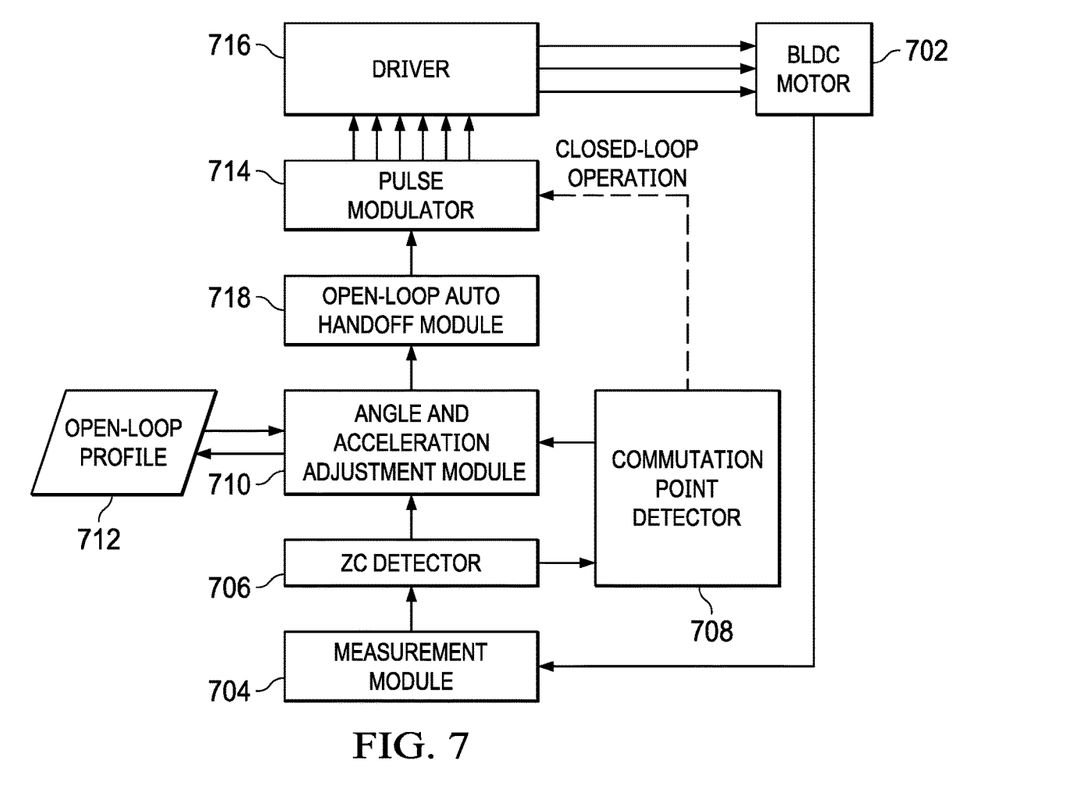
FIG. 7 is a block diagram illustrating an example of dynamic open-loop operation processing of a multi-phase electric BLDC motor.

FIG. 7 is a block diagram illustrating an example of dynamic open-loop operation processing of a multi-phase electric BLDC motor 702, which may correspond to motor 204. During open-loop operation, e.g., startup, the phase voltages, e.g., $V_A$, $V_B$ and $V_C$, as well as the corresponding phase currents, of BLDC motor 702 are fed back to, or sampled by, a measurement module 704 (e.g., corresponding to measurement logic 104), which measures the BEMF voltage for each phase. A ZC detector 706 is coupled to measurement module 704 to detect ZC locations or points (e.g., 602, 604, 606 and 608) in the BEMF voltages. A commutation point detector 708 coupled to ZC detector 706 receives the detected ZC locations and detects commutation points (e.g., 612, 614, 616 and 618) from the fed back phase currents/voltages and the input from ZC detector 706. While shown coupled to ZC detector 706, commutation point detector 708 may be directly coupled to measurement module 704. The detected ZC locations and detected commutation points are transmitted, or made accessible, to an angle & acceleration adjustment module 710, which stores or has access to an open-loop profile 712, e.g., the acceleration profile of motor 702. Angle & acceleration adjustment module 710 may correspond to a part of control logic 108 and/or embody part of the control functionality of motor controller 206.

Angle & acceleration adjustment module 710 uses the inputs from ZC detector 706 and may also use those from commutation point detector 708 to adjust the acceleration profile of BLDC motor 702, which may include adjusting/updating motor parameter(s), e.g., commutation points, as described above. In an example, angle & acceleration adjustment module 710 outputs updated/adjusted commutation points (e.g., 622, 624, 626 and 628) to an open-loop auto handoff module 718. Over the course of the open-loop processing, open-loop auto handoff module 718 monitors whether one or more parameters (e.g., the ZC-detection-based commutation points from commutation point detector 708) are properly aligned to enable handoff or transition to closed-loop operation as described above. For example, detected ZC locations may be compared with those of open-loop profile 712, which is then adjusted (delayed or advanced) based on that comparison to generate the updated commutation points. A pulse modulator 714 is coupled to, and receives control signals from, open-loop auto handoff/angle adjustment module 710. Based on the control signals pulse modulator 714 modulates the phase currents and phase voltages of BLDC motor 702. This information is transmitted to a driver 716 that supplies the phase currents to phase windings, e.g., phase windings A, B and C, of BLDC motor 702 to change acceleration of BLDC motor 702 in accordance with the control and processing performed by open-loop auto handoff/angle adjustment module 710. Open-loop auto handoff module 718 may correspond to a part of control logic 108 and/or embody part of the control functionality of motor controller 206.

Figure 8:
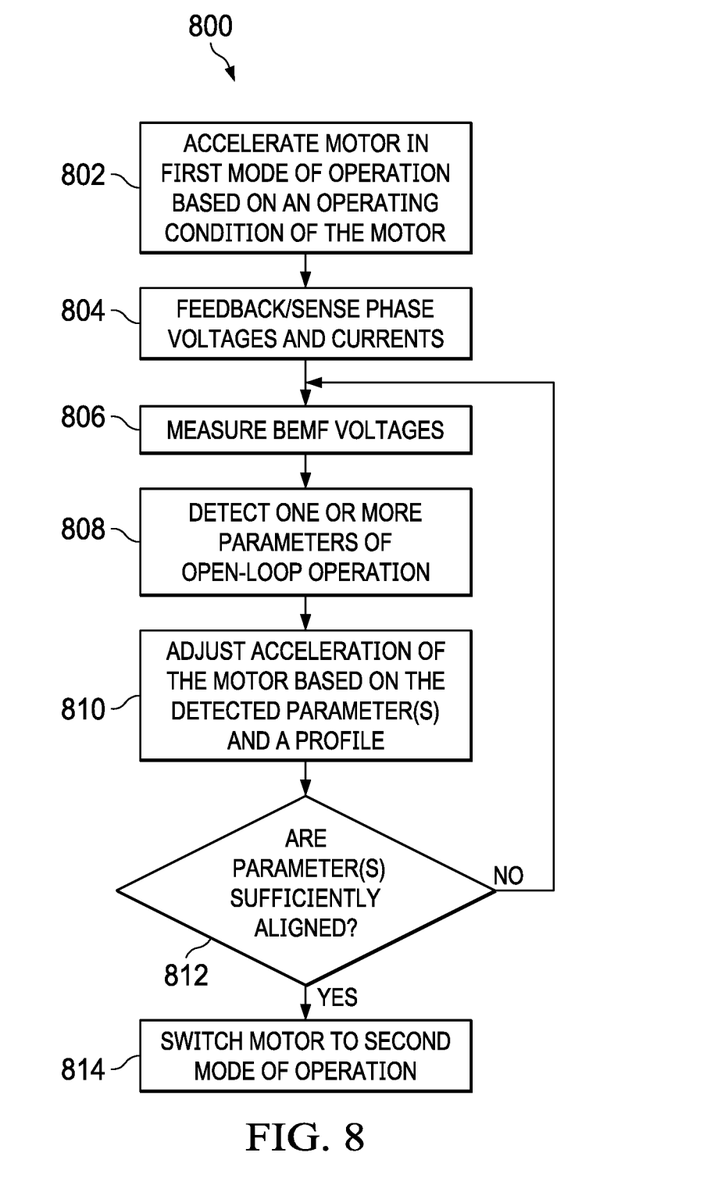
FIG. 8 is a flow diagram illustrating an example of operating an electric motor in a first mode of operation and determining when to switch to a second mode of operation.

FIG. 8 is a flow diagram of an example method 800 of operating an electric motor, e.g., a three-phase, electric BLDC motor in first (e.g., open-loop) mode to determine when to transition to a second (e.g., closed-loop) mode of operation. Initially, the motor is accelerated in the first mode of operation based on an operating condition of the motor (802). The operating condition may be the torque demand or applied current limit of the motor. During operation in the first mode, the phase voltages and currents of the motor are fed back and evaluated (804) the BEMF portions are measured (806). Using the phase currents and measured BEMF voltages, one or more parameters of the first mode operation are then detected or determined (808). In an example, ZC locations of the BEMF voltages are detected. In an example, commutation points are identified based on the detected ZC locations. In an example, updated or adjusted commutation points are determined. Based on the detected and/or determined parameter(s) and an operating profile (e.g., open-loop profile), a phase angle error is determined and acceleration of the motor is adjusted (or rotor angle is adjusted) to better align select parameter(s) with corresponding parameter(s) of the operating profile (810).

Then, it is determined whether to switch the motor to a second mode of operation, e.g., closed-loop operation. In an example, such determination entails comparing the detected/determined parameter(s) with each other or with corresponding parameter(s) of the operating profile to determine whether the parameter(s) are sufficiently aligned and have been for enough time to enable reliable transition to closed-loop operation (812). In an example, a comparison is made to determine whether ZC locations are within a set range of respective ZC locations of the open-loop profile. In an example, a comparison is made to determine whether ZC-based commutation points are within a set range of respective updated commutation points. To enable reliable transition, a further requirement may be imposed that the alignment be maintained for at least one electrical cycle. If the processing in block 812 indicates that sufficient alignment has not yet been attained, the process returns to block 806 for further processing. Otherwise, if the processing in block 812 reveals that sufficient alignment has been achieved and maintained, the motor is switched to closed-loop operation (814). After switching to closed-loop operation, pulse modulator 714 operates based on the output of commutation point detector 708, as indicated in FIG. 7.

FIG. 8 depicts one possible order of operations in transitioning an electric motor from a first mode of operation, e.g., open-loop operation to a second mode of operation, e.g., closed-loop operation. Not all operations need necessarily be performed in the order described. Some operations may be combined into a single operation. Additional operations may be performed as well.

Employing example motor control systems and methods described herein may eliminate lengthy, complex and manual tuning of parameters to identify the threshold at which to switch from open-loop operation to closed-loop operation, especially for different motors. Such systems and methods may also provide a more reliable technique for determining the transition point such that failures, e.g., commutation failures, are eliminated or significantly reduced during closed-loop operation. Unlike prior transition approaches, systems and methods described herein provide automatic mode change to increase system robustness and flexibility.

The term "coupled" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications of the described examples are possible, as are other examples, within the scope of the claims. Moreover, features described herein may be applied in other environments and applications consist with the teachings provided.

What is claimed is:

1. A process of operating an electric motor, comprising:
   accelerating a rotor of the electric motor in a first mode of operation based on an operating condition of the electric motor;
   detecting a parameter of the electric motor operating in the first mode of operation;
   adjusting an angular position of the rotor in the first mode of operation based on the detected parameter and an operating profile of the electric motor;
   adjusting a next commutation point of the electric motor based on the detected parameter and the adjusted angular position of the rotor; and
   determining when to transition operation of the electric motor from the first mode of operation to a second mode of operation based on the detecting operation and the adjusting operations.

2. The process of claim 1, wherein the parameter is back-electromotive force (BEMF) zero-crossing (ZC) locations.

3. The process of claim 1, wherein the adjusting of the angular position of the rotor in the first mode of operation includes changing acceleration of the rotor.

4. The process of claim 1, wherein the parameter includes back-electromotive force (BEMF) zero-crossing (ZC) locations, and the process further comprises:
   detecting each BEMF ZC location for at least one full rotation of the rotor;
   adjusting the angular position of the rotor in the first mode of operation after each detected BEMF ZC location based on the corresponding detected BEMF ZC location and the operating profile of the electric motor; and
   adjusting each of a plurality of commutation points of the electric motor based on the corresponding detected BEMF ZC locations and the corresponding adjusted angular positions of the rotor.

5. The process of claim 4, further comprising:
   detecting ZC-based commutation points based on the detected BEMF ZC locations; and
   comparing ZC-detection based commutation points with respective adjusted commutation points.

6. The process of claim 5, wherein it is determined to transition operation of the electric motor from the first mode of operation to the second mode of operation when the ZC-detection based commutation points are aligned with respective adjusted commutation points for at least one electrical cycle.

7. The process of claim 5, further comprising counting a number of detected ZC locations that occur at or after 15 electrical degrees, wherein it is determined to transition operation of the electric motor from the first mode of operation to the second mode of operation when the number is at least 6.

8. The process of claim 1, further comprising:
   updating the operating profile of the electric motor based on the detected parameter.

9. The process of claim 1, wherein the first mode of operation is an open-loop mode of operation and the second mode of operation is a closed-loop mode of operation.

10. The process of claim 1, wherein the operating condition of the electric motor is applied current limit of the electric motor.

11. A process of operating an electric motor having a rotor, comprising:
    detecting back-electromotive force (BEMF) zero-crossing (ZC) locations of the electric motor in an open-loop mode of operation based on a phase voltage or phase current of the electric motor;
    detecting ZC-based commutation points of the electric motor based on the detected BEMF ZC locations, respectively;
    adjusting an angular position of the rotor in the first mode of operation based on each detected BEMF ZC location and an open-loop profile of the electric motor;
    adjusting commutation points based on the detected ZC locations, respectively; and
    switching operation of the electric motor from the open-loop mode of operation to a closed-loop mode of operation when a set number of detected commutation points are within a set difference of respective updated commutation points.

12. The process of claim 11, further comprising:
updating the open-loop profile of the electric motor after each detected ZC location.

13. The process of claim 12, wherein the updating of the open-loop profile comprises updating an acceleration profile of the electric motor.

14. A system comprising:
measurement logic configured to measure a back-electromotive force (BEMF) of an electric motor having a rotor;
detection logic coupled to the measurement logic and configured to detect zero crossing (ZC) locations of the electric motor based on the measured BEMF and further configured to detect commutation points based on respective detected ZC locations (ZC-based commutation points);
control logic coupled to the detection logic and configured to adjust an acceleration profile of the electric motor and a next commutation point of the electric motor based on information obtained from the detection logic, determine alignment between each of multiple pairs of commutation points, each pair including a ZC-based commutation point and a corresponding detected commutation point, and determine a timing for transitioning the electric motor from an open-loop mode of operation to a closed-loop mode of operation based on the determined alignments.

15. The system of claim 14, wherein the detection logic includes a zero crossing (ZC) detector to detect the ZC locations.

16. The system of claim 15, wherein the detection logic includes a commutation point detector coupled to the ZC detector to detect the commutation points.

17. The system of claim 16, wherein the control logic includes an adjustment module coupled to at least one of the ZC detector and the commutation point detector.

18. The system of claim 17, wherein the control logic includes an open-loop auto handoff module coupled to the adjustment module.

19. A process of operating an electric motor having a rotor, the process comprising:
detecting zero-crossing (ZC) locations while driving the electric motor in an open-loop mode of operation;
adjusting an angular position of the rotor based on detection of one or more detected ZC locations;
updating at least one parameter of an open-loop profile of the electric motor after the adjusting operation; and
updating a commutation point following a last of the one or more detected ZC locations in response to adjusting the angular position of the rotor and updating at least one parameter of the open-loop profile.

20. The process of claim 19, wherein the at least one parameter includes a rate at which the electric motor is incremented.

21. The process of claim 19, further comprising:
resetting the angular position of the rotor to a set angular position when a ZC location is not detected in 45° from a last detected ZC location.

* * * * *